(12) United States Patent
Truong et al.

(10) Patent No.: US 12,106,383 B2
(45) Date of Patent: *Oct. 1, 2024

(54) COMMUNICATION ANALYSIS FOR FINANCIAL TRANSACTION TRACKING

(71) Applicant: Capital One Services, LLC, McLean, VA (US)

(72) Inventors: Anh Truong, Champaign, IL (US); Galen Rafferty, Mahomet, IL (US); Jeremy Goodsitt, Champaign, IL (US); Vincent Pham, Seattle, WA (US); Austin Walters, Savoy, IL (US); Alvin Hua, Clarksburg, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,366

(22) Filed: Apr. 17, 2023

(65) Prior Publication Data

US 2023/0252581 A1 Aug. 10, 2023

Related U.S. Application Data

(63) Continuation of application No. 17/173,909, filed on Feb. 11, 2021, now Pat. No. 11,651,443.

(51) Int. Cl.
*G06Q 40/00* (2023.01)
*G06F 16/2455* (2019.01)
(Continued)

(52) U.S. Cl.
CPC ......... *G06Q 40/12* (2013.12); *G06F 16/2455* (2019.01); *G06F 40/279* (2020.01); *G06Q 30/016* (2013.01)

(58) Field of Classification Search
CPC ...... G06Q 30/016; G06Q 40/12; G06N 20/00; G06N 3/043; G06F 16/3344;
(Continued)

(56) References Cited

U.S. PATENT DOCUMENTS 8,229,849 B2    7/2012   Olliphant et al.
8,762,270 B1 *  6/2014   Evans ................... G06Q 40/00
                                                  455/406

(Continued)

OTHER PUBLICATIONS

U.S. Appl. No. 17/170,606, filed Feb. 8, 2021, titled Systems and Methods for Warranty Coverage Alerts Based on Acquisition Data.

*Primary Examiner* — Florian M Zeender
*Assistant Examiner* — Milena Racic
(74) *Attorney, Agent, or Firm* — Banner & Witcoff, Ltd.

(57) ABSTRACT

Methods, systems, and apparatuses for correlating electronic communications related to financial transactions. A computing device may receive a first communication related to an update to a past financial transaction. The computing device may identify a second communication by querying, based on the first communication, a communications database. The first communication and second communication may be correlated using one or more natural language processing algorithms. Based on correlating the first communication and second communication, the computing device may identify a portion of the second communication corresponding to the at least one good or service of the past financial transaction by processing, using the one or more natural language processing algorithms, the second communication. The computing device may then cause output of data indicating a correlation between the first communication and the second communication, and the indication of the change to the at least one good or service.

20 Claims, 8 Drawing Sheets

(51) Int. Cl.
*G06F 40/279* (2020.01)
*G06Q 30/016* (2023.01)
*G06Q 40/12* (2023.01)

(58) Field of Classification Search
CPC .. G06F 16/258; G06F 16/2455; G06F 40/279; G06F 30/016
See application file for complete search history.

(56) References Cited

U.S. PATENT DOCUMENTS

| | | | |
|---|---|---|---|
| 9,691,085 | B2 | 6/2017 | Scheidelman |
| 10,475,006 | B2 | 11/2019 | Kieffer et al. |
| 10,650,358 | B1 * | 5/2020 | Edwards .............. G06Q 30/012 |
| 11,257,095 | B2 | 2/2022 | Singh et al. |
| 11,393,026 | B1 | 7/2022 | Parker et al. |
| 11,526,511 | B1 | 12/2022 | Tankersley et al. |
| 11,651,443 | B2 * | 5/2023 | Truong ................. G06Q 40/12 |
| | | | 705/30 |
| 11,922,376 | B2 * | 3/2024 | Katzer ................. G06Q 20/201 |
| 2002/0128851 | A1 | 9/2002 | Chefalas et al. |
| 2007/0299772 | A1 | 12/2007 | Mastie et al. |
| 2011/0131135 | A1 | 6/2011 | Carlson et al. |
| 2012/0330971 | A1 | 12/2012 | Thomas et al. |
| 2016/0148209 | A1 | 5/2016 | Hammond et al. |
| 2017/0186017 | A1 | 6/2017 | High et al. |
| 2019/0287117 | A1 * | 9/2019 | Danyluk .............. G06Q 30/014 |
| 2022/0121884 | A1 | 4/2022 | Zadeh et al. |
| 2022/0215419 | A1 | 7/2022 | Dermosessian et al. |
| 2022/0222671 | A1 | 7/2022 | Ribero et al. |
| 2022/0253951 | A1 * | 8/2022 | Truong ................. G06F 40/284 |

* cited by examiner

We detected a refund for your purchase of two drinks on Nov. 1. The purchase was for $5.99, and the refund was for $3.99. The $3.99 has been refunded to your account ending in 0123.

COMMUNICATION ANALYSIS FOR FINANCIAL TRANSACTION TRACKING

CROSS REFERENCE TO RELATED APPLICATIONS

This application is a continuation of U.S. patent application Ser. No. 17/173,909, filed Feb. 11, 2021, titled Communication Analysis for Financial Transaction Tracking. The contents of the above listed application is expressly incorporated herein by reference in its entirety for any and all non-limiting purposes.

FIELD OF USE

Aspects of the disclosure relate generally to the processing of communications. More specifically, aspects of the disclosure may provide for using natural language processing techniques to correlate communications relating to financial transactions.

BACKGROUND

Financial transactions are increasingly conducted via computing devices, such as laptops and smartphones. For example, a consumer may purchase items online via a web browser executing on a computing device, and/or might use a payment application on a smartphone to provide payment details to a point-of-sale device at a physical store. As part of these financial transactions, electronic communications are often generated and sent to, e.g., transaction participants. For example, after purchasing goods or services online, a purchaser may receive a confirmation e-mail or text message. These communications generally indicate, among other things, the amount and/or time of the financial transaction, one or more goods or services involved in the financial transaction, a merchant associated with the financial transaction, and the like.

The frequency with which financial transaction communications are conducted using computing devices may make it prohibitively difficult for transaction participants to track changes to a financial transaction. For example, a consumer that has returned one of a plurality of goods of a past purchase might find it difficult to determine whether a refund was issued for one of the plurality of goods without lengthy and convoluted review of past e-mails or text messages. As another example, a large business entity that purchases large quantities of raw goods on a regular basis might find it difficult to continually track which portions of those raw goods have been used, returned, and/or refunded without devoting significant time to reviewing past e-mails and communications with vendors.

Aspects described herein may address these and other problems, and generally improve the quality, efficiency, and speed of computer-implemented communication systems by offering improvements to the way in which communications associated with past financial transactions are tracked, correlated, and output.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for correlation of transaction communications using techniques such as natural language processing. This may have the effect of providing output that details transaction history over time, thereby avoiding the need for users to manually review voluminous and quite complicated transaction communications. According to some aspects, these and other benefits may be achieved by processing and correlating transaction communications stored by a computing device, and generating output based on natural language processing of those communications.

More particularly, some aspects described herein may provide a computer-implemented method for correlating electronic communications associated with financial transactions. A computing device may receive, from a communications database, a first communication that indicates an update to a past financial transaction. For example, the first communication may be a refund confirmation. In response to receiving the first communication, the computing device may identify a second communication by querying, based on the first communication, the communications database. The second communication may comprise, for example, a purchase confirmation. The computing device may then correlate the first communication and the second communication by identifying at least one good or service of the past financial transaction by processing, using one or more natural language processing algorithms, the first communication and identifying a portion of the second communication corresponding to the at least one good or service of the past financial transaction by processing, using the one or more natural language processing algorithms, the second communication. The computing device may then, based on correlating the first communication and the second communication, generate an indication of a change to the at least one good or service by comparing the first communication and the second communication. The indication of the change may indicate, for example, that an item has been refunded. The computing device may cause output of data indicating a correlation between the first communication and the second communication, and the indication of the change to the at least one good or service.

According to some embodiments, the first communication may correspond to a refund of one or more portions of the past financial transaction, and the second communication may correspond to a purchase of the at least one good or service. Querying the communications database may comprise retrieving metadata corresponding to the first communication, wherein querying the communications database comprises querying the communications database based on the metadata. The computing device may transmit, to the communications database, the data indicating the correlation between the first communication and the second communication, and causing the communications database to associate the first communication and the second communication based on the data. The computing device may comprise receiving, from a payment card database, payment information associated with the past financial transaction, identifying a payment discrepancy by comparing the change to the at least one good or service with the payment information associated with the past financial transaction, and outputting information associated with the payment discrepancy. Comparing the first communication and the second communication may comprise comparing the portion of the second communication corresponding to the at least one good or service of the past financial transaction with a corresponding portion of the first communication.

The portion of the second communication may be identified in a variety of ways. Identifying the portion of the second communication corresponding to the at least one good or service of the past financial transaction may comprise identifying, in the second communication, an identifier of the at least one good or service, wherein the first communication comprises the identifier. Identifying the portion of the second communication corresponding to the at least one good or service of the past financial transaction may comprise identifying, in the second communication, a refund amount corresponding to the at least one good or service, wherein the first communication comprises a payment amount equal to the refund amount. Identifying the portion of the second communication corresponding to the at least one good or service of the past financial transaction may comprise determining, based on one or more words of the second communication, that the second communication relates to one or more of: a refund, a return, or a replacement.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 8 depicts an electronic communication which may be output as the result of the steps depicted in FIG. 2.

DETAILED DESCRIPTION

Figure 1:
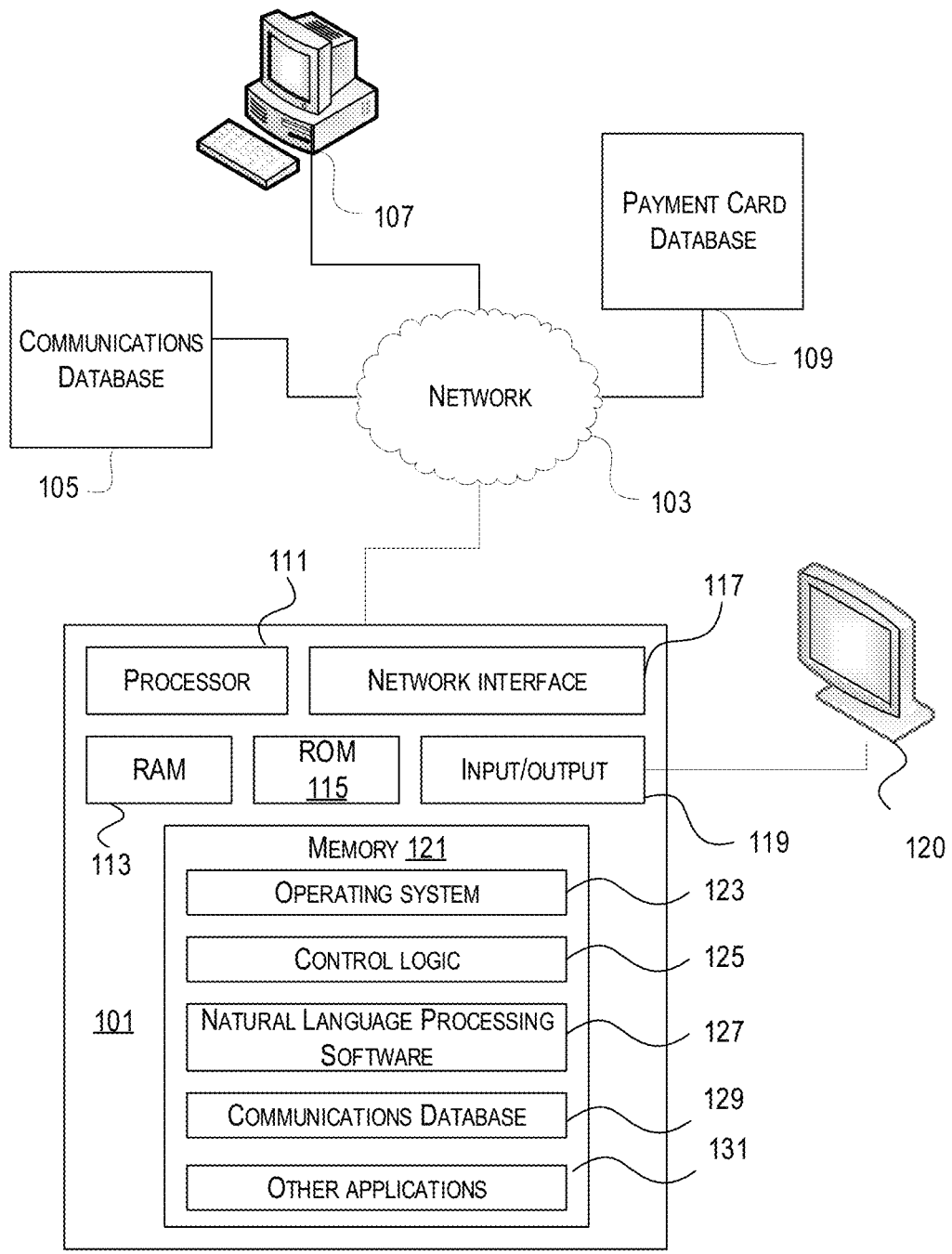
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for correlating electronic communications relating to financial transactions. As discussed further herein, this combination of features may allow for the correlation of disparate, voluminous, and/or hard-to-find electronic communications (e.g., in a communications database), as well as the identification of circumstances where mistakes and/or inaccuracies may exist in financial transactions. For instance, aspects described herein may allow a purchaser to easily track purchases and refunds, even when that information may be spread across a variety of past electronic communications to the purchaser. As another example, aspects described herein may enable a manufacturer to easily track the purchase of, return of, and/or refunds relating to packages of raw goods, such that the manufacturer need not laboriously track every single package when it is received. As yet another example, the aspects described herein use natural language processing such that, should electronic communications for the same transaction be received at different times, in different formats, and via different methods, the communications may nonetheless be processed and correlated.

The disclosure described herein improves the functioning of computing devices by improving the manner in which computing devices store, analyze, and output information regarding electronic communications. The wide volume and format of electronic communications received by computing devices can make processing and correlation of those electronic communications particularly difficult. As a simple example, even today, users must manually sort received e-mails into various folders and labels to indicate that those e-mails share a common topic. This problem is particularly pronounced with electronic communications related to financial transactions, which are often in a wide variety of formats and which may be internally contradictory. For example, a purchase confirmation might be received via a relatively detailed e-mail, whereas a refund confirmation might be received via a one-sentence text message. As another example, a purchase confirmation e-mail may be in a first format, whereas a refund confirmation e-mail might be in a second format different from the first format. As yet another example, only one purchase confirmation text message may be received, but multiple refund text messages may be received, such that each of the multiple refund text messages correspond to a different part of the original financial transaction being refunded. All such differences make ready correlation of multiple electronic communications related to financial transactions prohibitively difficult for computing devices, meaning that those devices may struggle to organize communications in a manner which is readily understood by users. As such, the disclosure described herein improves the functioning of the way in which computing devices handle those electronic communications, including how computing devices are able to correlate different electronic communications which may be received at different times, via different methods, and/or in different formats.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes (such as the computing device 101, a communications database 105, a desktop computer 107, and/or a payment card database 109) may be interconnected via a network 103, such as the Internet. Other networks may also or alternatively be used, including private intranets, corporate networks, LANs, wireless networks, personal networks (PAN), and the like. The network 103 is for illustration purposes, and may be replaced with fewer or additional computer networks. A local area network (LAN) may have one or more of any known LAN topology and may use one or more of a variety of different protocols, such as Ethernet. The computing device 101, the communications database 105, the desktop computer 107, the payment card database 109, and/or other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, natural language processing software 127, a communications database 129 (e.g., as part of e-mail and/or text message software), and other applications 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Two communications databases (the communications database 105 and the communications database 129) are shown in FIG. 1. A communications database may be any database configured to store, manage, and/or otherwise handle electronic communications. For example, the communications database 105 may correspond to a web-based e-mail system, whereas the communications database 129 may correspond to a text messaging system. In other embodiments, the communications database 105 or the communications database 129 may be omitted, such that only one communications database may be present.

The computing device 101, the communications database 105, the desktop computer 107, the payment card database 109, and/or other devices (not shown) may have similar or different architecture as described with respect to computing device 101. Those of skill in the art will appreciate that the functionality of computing device 101 (or any of the other devices portrayed in FIG. 1) as described herein may be spread across multiple data processing devices, for example, to distribute processing load across multiple computers, to segregate transactions based on geographic location, user access level, quality of service (QoS), etc. For example, the computing device 101, the communications database 105, the desktop computer 107, the payment card database 109, and/or other devices (not shown) may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for correlating communications associated with financial transactions.

Figure 2:
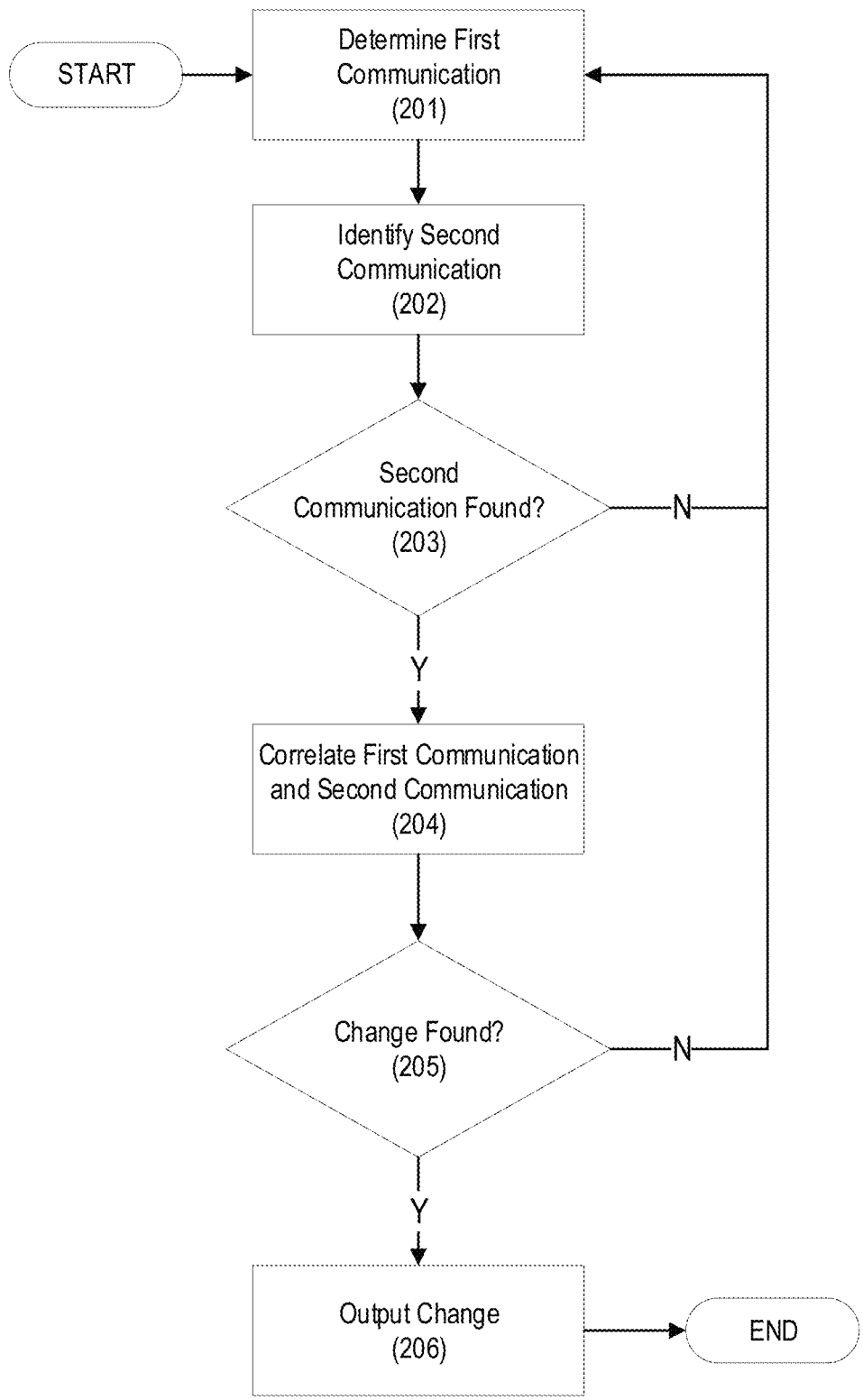
FIG. 2 depicts a flow chart comprising steps for correlating communications relating to financial transactions.

FIG. 2 illustrates an example method 200 for correlating electronic communications in accordance with one or more aspects described herein. The method 200 may be implemented by a suitable computing system, as described further herein. For example, the method 200 may be implemented by any suitable computing environment by a computing device and/or combination of computing devices, such as the computing device 101, the communications database 105, the desktop computer 107, and/or the payment card database 109 of FIG. 1. The method 200 may be implemented in suitable program instructions, such as part of the control logic 125, the operating system 123, and/or the applications 131.

In step 201, the computing device 101 may determine a first communication. The first communication may be, for example, a refund e-mail or text message. The first communication may relate to a financial transaction, such as a financial transaction that has occurred in the past. The first communication may be received from a database, such as the communications database 129 and/or the communications database 105. For example, determining the first communication may comprise receiving, from a communications database, a first communication that indicates an update to (e.g., a refund of a part of) a past financial transaction.

Communications, such as the first communication, may be any form of electronic communication that may be received by a computing device, such as the computing device 101. As such, communications may comprise an e-mail, a text message, or any similar type of communication which may be transmitted to and received by a computing device. Communications may be formatted in a variety of ways. For example, a first e-mail may be formatted using Hypertext Markup Language (HTML), whereas a second e-mail may be formatted in plain text. Communications may be received at different times. For example, a first communication may be received hours, days, or weeks before a second communication. Communications may comprise metadata. For example, metadata may comprise a timestamp indicating when a communication was sent, a timestamp indicating when a communication was received, an encryption level of the communication, a sender of the communication, an intended recipient of the communication, a listing of one or more computing devices (e.g., servers, gateways) which handled the communication during transmission, or the like.

In step 202, the computing device 101 may identify a second communication. Identifying the second communication may comprise querying a communications database (e.g., the communications database 129 and/or the communications database 105) to search for the second communication. For example, in response to receiving a first communication, the computing device 101 may identify a second communication by querying, based on the first communication, a communications database. The second communication may be identified based on the first communication. For instance, the computing device 101 may retrieve metadata corresponding to a first communication, then query a communications database based on the metadata to search for the second communication.

Querying the communications database (e.g., the communications database 129 and/or the communications database 105) to search for the second communication may comprise determining, based on the first communication, predicted characteristics of the second communication. For instance, if the first communication relates to a refund, the query may search for communications received before the first communication was received, as it is unlikely that a purchase confirmation communication would be received after a refund communication was sent. As another example, if the first communication is received from a particular e-mail address or phone number, then the query may comprise all or portions of the e-mail address or phone number. In this way, if an organization regularly sends purchase confirmations and refund confirmations from e-mail addresses with, for example, a common domain name, such a domain name may be used to query the communications database.

As indicated above, as part of determining the first communication in step 201 and/or identifying the second communication in step 202, the computing device may access a communications database (e.g., the communications database 129 and/or the communications database 105). For example, where the communications database is storage for an e-mail application, steps 201 and/or 202 may comprise scanning the e-mail of a user to search for, for instance, the first communication and/or the second communication. As a prerequisite to accessing the communications database, a user may be asked to provide appropriate permissions. For example, a user might limit steps 201 and 202 to accessing certain types of communications stored in the communications database (e.g., those addressed to a particular e-mail address, those stored in a particular folder, or the like).

In step 203, the computing device 101 may determine whether it found a second communication in step 202. In some instances, the computing device 101 might not locate a second communication. For example, if the first communication is a refund notification received months after a purchase, then the second communication (which might be, for example, a purchase confirmation) might have long since been deleted. If a second communication was found, the method 200 proceeds to step 204. Otherwise, the method 200 returns to step 201.

In step 204, the computing device 101 may correlate the first communication and the second communication. Correlating the first communication and the second communication may comprise determining that the first communication and the second communication are related, relate to the same or similar goods or services, originate from the same merchant, identify the same transaction identifier, or the like. Such correlation may be performed using one or more natural language processing algorithms, which may be all or portions of the natural language processing software 127. For example, the computing device 101 may correlate the first communication and the second communication by identifying at least one good or service of the past financial transaction by processing, using one or more natural language processing algorithms, the first communication and by identifying a portion of the second communication corresponding to the at least one good or service of the past financial transaction by processing, using the one or more natural language processing algorithms, the second communication.

As part of correlating the first communication and the second communication, the computing device 101 may determine that the first communication and the second communication both comprise an identifier of at least one good or service. In this manner, a natural language processing algorithm may identify, in the first communication and the second communication, a common good or service name, a common unique identification number for a good/service, or the like. In this manner, the natural language processing algorithm may correlate an item referenced by the first communication with an item referenced by the second communication. Such an identifier may comprise, for example, an alphanumeric string (e.g., a name of a good or service, a unique identification code of a good or service), an image (e.g., a picture of the good or service), or the like.

As part of correlating the first communication and the second communication, the computing device 101 may determine that the first communication comprises a payment amount similar or equal to a refund amount indicated by the second communication. For example, the computing device 101 may identify, in the second communication, a refund amount corresponding to at least one good or service, and the first communication may comprise a payment amount equal to the refund amount. The payment amount need not equal the refund amount: for example, depending on applicable taxes, discounts, and other considerations, the refund amount and the payment amount may be close but not exactly the same. In this manner, even if the goods and/or services are not referenced explicitly by the first communication and/or the second communication, the natural language processing algorithm may determine that the two may relate to the same or a similar good and/or service.

As part of correlating the first communication and the second communication, the computing device 101 may determine that the first communication corresponds to a purchase of at least one good or service in a past financial transaction, and that the second communication corresponds to a refund of one or more portions of the past financial transaction. The computing device 101 may verify that the first communication corresponds to the purchase of at least one good or service by comparing the purchase to one or more purchasers in the user's account. Similarly, computing device 101 may verify that the second communication corresponds to the refund of one or more portions of the past financial transaction by comparing the refund (e.g., amount, product name, product identifier, SKU, etc.) to one or more refunds and/or transactions in the user's account. In some instances, the first communication may correspond to a refund of one or more portions of a past financial transaction. For example, the first communication may be a refund confirmation e-mail or text message that indicates that one or more items have been refunded, and/or that an amount of money has been returned to a buyer. The second communication might be older than the first communication, and may comprise information about the original purchase of the at least one good or service. For example, the second communication may be a purchase confirmation e-mail.

As part of correlating the first communication and the second communication, the computing device 101 may identify one or more words of the second communication that relate to one or more of: a refund, a return, or a replacement. A natural language processing algorithm (e.g., as part of the natural language processing software 127) may be configured to identify certain words which indicate that a communication is related to a purchase, refund, return, or the like. For example, words such as "refund" or "reimbursement" may indicate that a communication relates to the refund of a good or service, whereas words such as "purchase" and phrases such as "thank you for your purchase" may indicate that a communication relates to the purchase of goods or services. The words and/or phrases used to identify such communications may be based on historic activity by merchants. For example, if a merchant typically uses certain words or phrases along with a purchase or refund communication, then those words or phrases may be used by one or more natural language processing algorithms to identify the purchase or refund communications.

In step 205, the computing device 101 may determine whether a change was found with respect to one or more goods or services. Based on correlating the first communication and the second communication, the computing device 101 may detect one or more changes to one or more goods or services associated with a financial transaction. For example, the second communication may relate to a refund of a good or service purchased in the past, and the first communication may be the original purchase confirmation of that good or purchase. As another example, the second communication may relate to a return of a good or service purchased in the past, and the first communication may be the original purchase confirmation of that good or purchase. If a change is found, the method 200 proceeds to step 206. Otherwise, the method 200 returns to step 201.

As part of determining the change, the computing device 101 may verify the change to, e.g., verify the amount and nature of a refund. The computing device 101 may receive, from a payment card database such as the payment card database 109, payment information associated with one or more past financial transactions. For example, the payment card database may be managed by a credit card company, and the payment information may be a list of transactions conducted by a particular credit card or checking account. The computing device 101 may compare the change with the payment information to determine whether a payment discrepancy exists. For example, if the first communication indicates a refund to a customer and the payment information indicates that no refund was received, such a circumstance may be flagged by the computing device 101 as a payment discrepancy. The computing device 101 may then output information associated with the payment discrepancy. In this manner, relevant parties may be informed of instances in which modifications to a financial transaction might have been made in error. For example, the computing device 101 may receive, from a payment card database, payment information associated with the past financial transaction, then identify a payment discrepancy by comparing the change to the at least one good or service with the payment information associated with the past financial transaction, and then output information associated with the payment discrepancy.

In step 206, the computing device 101 may output an indication of the change with respect to the one or more goods or services. The change may relate to one or more goods or services of a past financial transaction detailed by the first communication and/or the second communication. As such, the indication may comprise, for example, an indication that all or some goods and/or services of a past financial transaction have been refunded. In some instances, an error may exist, such as where a purchaser was refunded more or less than what they were entitled to be refunded. In such a circumstance, the indication of the change may indicate a degree of discrepancy between, for example, an expected refund amount and a received refund amount. The indication of the change may be used to track, over time, whether all items of a particular financial transaction have been received and/or refunded. For example, if multiple refund processes have been initiated for a single financial transaction, then the output from step 206 may be used to track which portion(s) of the financial transaction have been refunded.

The indication of the change with respect to the one or more goods or services may be used to issue notifications and/or reminders regarding the one or more goods or services. Such notifications and/or reminders may include, for example, a reminder to a merchant that a refund has not been issued, a reminder to a customer that an error was detected with respect to a previous refund (e.g., and an indication that the customer should call the merchant), a reminder to the customer that a refund has not yet been received (e.g., after a predetermined amount of time after receiving the first communication), or the like. The notifications and/or reminders may be transmitted to the communications database 105 (e.g., such that a customer and/or merchant get a text and/or e-mail reminder associated with the one or more goods or services), and/or to the payment card database 109 (e.g., to indicate that a discrepancy was found with respect to one or more transactions).

The indication of the change with respect to the one or more goods or services may be used as input for an expense reporting system. An expense reporting system, such as one or more accounting programs, may be configured to track debits and credits, such as purchases and refunds of goods and/or services. Such expense reporting systems might be used to, for example, assemble financials at the end of a financial year and/or for the purposes of tax accounting. As such, the change with respect to the one or more goods or services may be used by the expense reporting system to check whether both a payment for and refund for a good and/or service has been entered into the system, and/or as an indication that an error may occur with respect to a refund. An example of such an expense reporting system is provided below with respect to FIG. 6.

As part of outputting the indication of the change, the computing device 101 may cause a communications database (e.g., the communications database 105 and/or the communications database 129) to associate the first communication and the second communication. The communications database 105 and/or the communications database 129 may store communications in a manner which allows those communications to be interrelated. For example, the communications database 105 may be configured to group communications into categories, to tag communications with common tags, or the like. As such, the computing device may, based on the change determined in step 205, transmit, to a communications database, instructions for associating the first communication and the second communication. For example, the computing device 101 may transmit, to a communications database, data indicating a correlation between a first communication and a second communication; and then cause the communications database to associate the first communication and the second communication based on the data.

The computing device 101 may additionally and/or alternatively output data indicating a correlation between the first communication and the second communication. For example, the computing device 101 may display, in a user interface of an e-mail application, an indication that the second communication is related to the first communication. This data may permit a user to, for instance, display the first communication and the second communication side-by-side, to swap between the two communications, or the like. In this manner, the laborious task of locating and reviewing both the first communication and the second communication might be mitigated.

Figure 3:
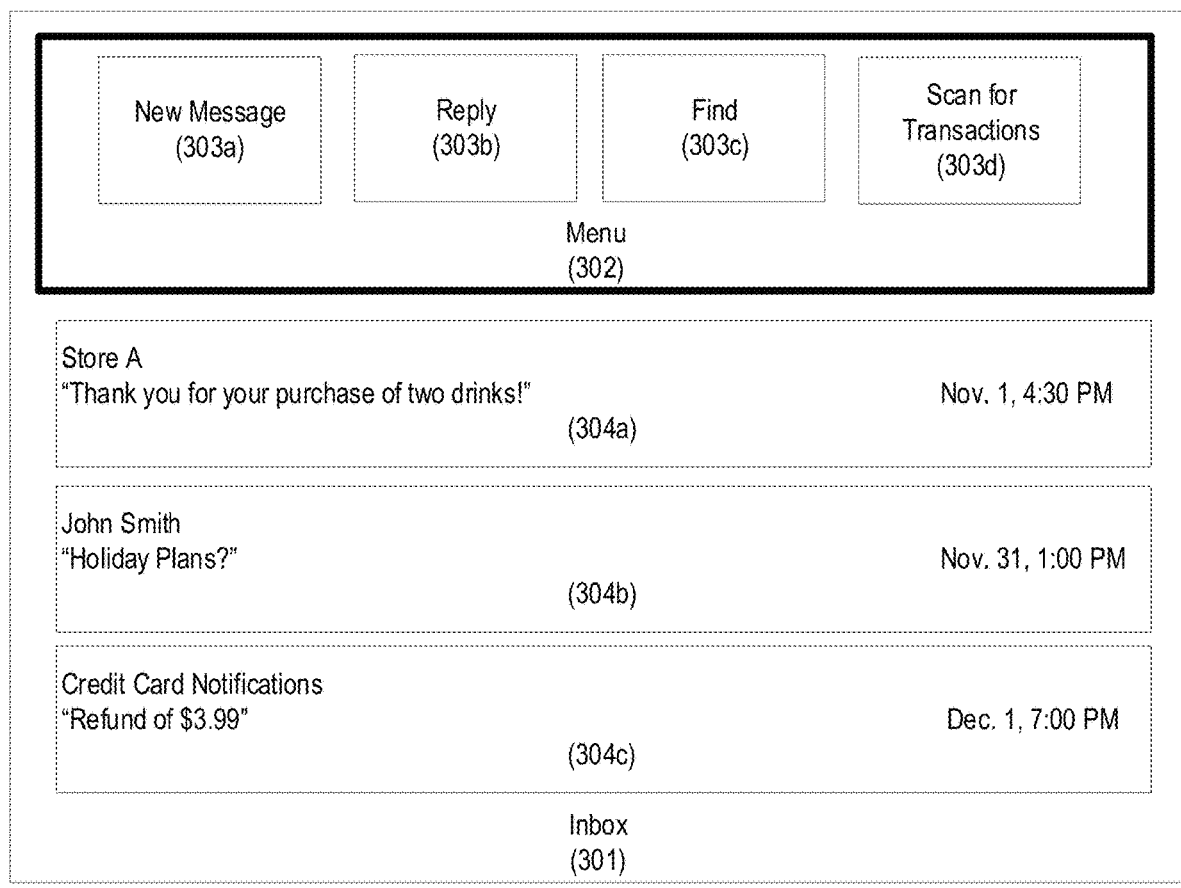
FIG. 3 depicts an inbox with a plurality of electronic communications.

FIG. 3 depicts an inbox 301 with a menu 302 with options 303*a*-303*d* and a plurality of electronic communications 304*a*-304*c*. In particular, FIG. 3 depicts an example of a communications application inbox where a user may select an option (and, in particular, a scan for translations option 303*d*) to cause performance of one or more of the steps of FIG. 2. The inbox 301 may be part of a communications application, such as an e-mail application that is part of the other applications 131, and the plurality of electronic communications 304*a*-304*c* may be stored by a communications database, such as the communications database 129. Accordingly, the inbox 301 might be an inbox for a text messaging application, an e-mail application, or the like.

The menu 302 depicts various options 303*a*-303*d* which might be selected by a user of an application. A new message option 303*a* may allow a user to create and send a new electronic communication. A reply option 303*b* may allow a user to reply to an electronic communication, such as any of the electronic communications 304*a*-304*c*. A find option 303*c* may allow a user to search through electronic communications, such as the electronic communications 304*a*-304*c*. The scan for transactions option 303*d* may be configured to cause performance of one or more of the steps of FIG. 2. For example, the scan for transactions option 303*d* may be selected by a user, and in response, a computing device may search through the electronic communications 304*a*-304*d* to find a first communication in accordance with step 201 of FIG. 2.

The scan for transactions options 303*d* is provided as an example, and the steps described in FIG. 2 may be performed automatically, on a periodic basis, or the like. For example, though FIG. 3 represents a button which may be pushed in an application to cause the steps depicted in FIG. 2, the process depicted in FIG. 2 may be performed automatically every hour and need not be initiated by a user.

The electronic communications 304*a*-304*c*, as detailed with respect to FIG. 2, may be any type of electronic communications. As shown in FIG. 3, a first electronic communication 304*a* might comprise a purchase confirmation, a second electronic communication 304*b* might comprise a personal message about the holidays, and a third electronic communication 304*c* may comprise a refund notification. In the context of FIG. 2, the third communication 304*c* (that is, the refund confirmation) might correspond to the first communication discussed with respect to step 201 of FIG. 2, whereas the first communication 304*a* might correspond to the second communication discussed with respect to step 202 of FIG. 2.

The electronic communications 304*a*-304*c* are examples, and the inbox 301 may comprise a large number of different electronic communications. As such, the steps described in FIG. 2 (e.g., determining a first communication in step 201, then identifying a second communication in step 202) recognize that, in some instances, the inbox 301 might comprise a large number of electronic communications, and searching may be necessary to locate electronic communications. This is particularly the case where, for example, the third electronic communication 304*c* (which merely indicates a "Refund of $3.99") might not obviously be related to the same transaction as the first electronic communication 304*a* (which states "Thank you for your purchase of two drinks!").

Figure 4A:
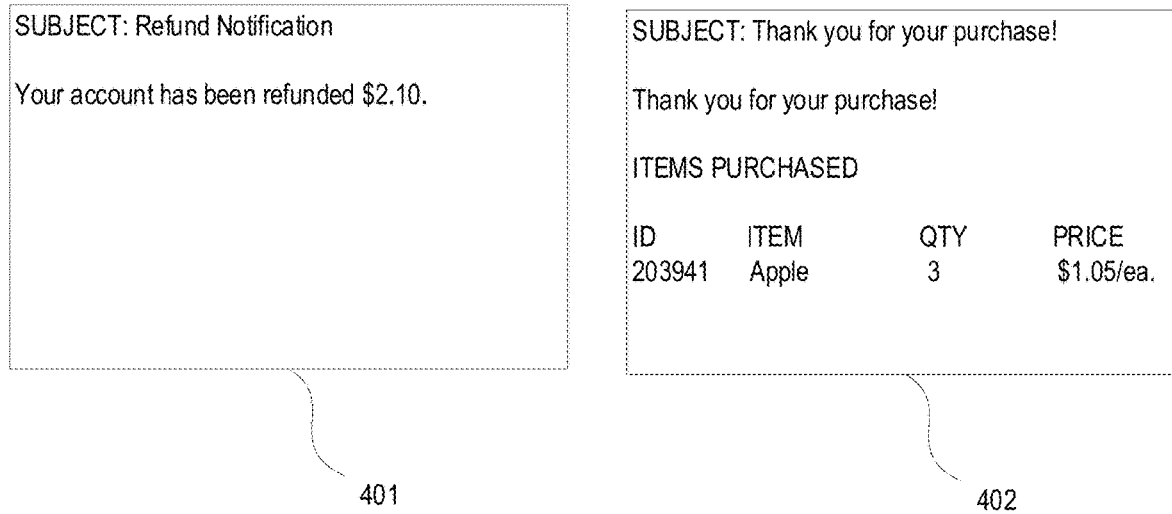
FIG. 4A depicts two electronic communications.

FIG. 4A depicts a first communication 401 and a second communication 402. The communications depicted in FIG. 4A are examples, and any type of format of communications may be received or sent. For example, the first communication 401 may be an e-mail, whereas the second communication 402 may be a text message. As another example, the first communication 401 and the second communication 402 may be the same or similar as the electronic communications 304*a*-304*c*. As can be seen in FIG. 4A, the first communication 401 is a refund confirmation, indicating that a refund has been issued for $2.10. The second communication 402, which may be a purchase confirmation, indicates that three apples (with ID 203941) were purchased for $1.05 each. Without significant manual effort, these two communications might not be correlated by a human being, particularly since the first communication 401 does not explicitly indicate that the refund is related to the purchase indicated in the second communication 402.

As discussed above with respect to FIG. 2, the first communication 401 may be received before the second communication 402 is determined. For example, the first communication 401 may have been recently received and, based on content in the first communication 401 (e.g., metadata of the first communication 401), the second communication 402 may be located by, e.g., querying a communications database.

Figure 4B:
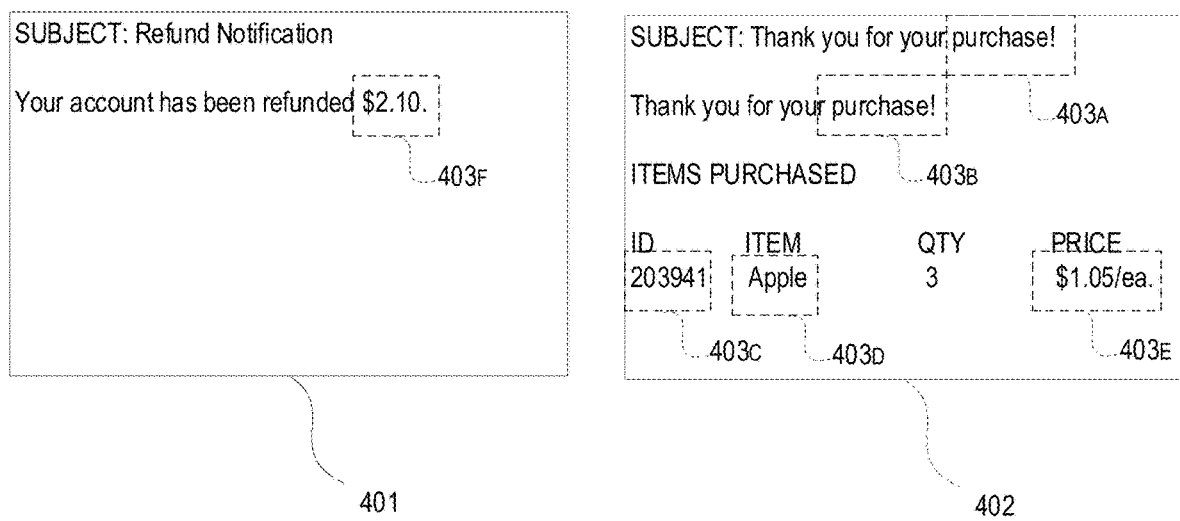
FIG. 4B depicts two electronic communications in a manner that highlights elements which may be analyzed by one or more natural language processing algorithm.

FIG. 4B depicts how one or more natural language processing algorithms may process the content of the first message 401 and the second message 402. The one or more natural language processing algorithms may identify one or more elements of the communications. Such a process may additionally and/or alternatively be referred to as entity recognition. The natural language processing algorithm may begin by analyzing a likely purchase confirmation, such as the second communication 402. For example, with respect to the second communication 402, the one or more natural language processing algorithms may identify elements such a first instance of the word "purchase" (element 403A), a second instance of the word "purchase" (element 403B), an item identifier code (element 403C), an item name (element 403D), and a price (element 403E). Continuing that example, and with respect to the first communication 401, the one or more natural language processing algorithms may identify a refund amount (element 403F). It may be desirable for the one or more natural language processing algorithms to start with the more detailed communication (e.g., in the circumstance depicted in FIG. 4B, the second communication 402) and work to identify items, prices, and similar information, then turn to less detailed communications (e.g., in the instance depicted in FIG. 4B, the first communication 401) to determine any correlations.

The first communication 401 and second communication 402 may be correlated even though they might not precisely match or be easily correlated. For example, as can be seen by comparing element 403E and element 403F, the prices indicated in the first communication 401 and second communication 402 need not match. As a particular example, to correlate the first communication 401 and the second communication 402, a logical inference must be made: that two apples (that is, 2×$1.05, as indicated by the second communication 402) were refunded (as indicated by the first communication 401). As such, the one or more natural language processing algorithms may be configured to use thresholds and/or fuzzy logic in order to correlate communications. This is particularly the case for the name of goods or services (which might change over time), the price of goods or services (which might be displayed with or without tax, depending on the communication), and the like. Moreover, this may be important where some, but not all, of a transaction is refunded. For example, if an original purchase was for three items but only two are refunded, then the refunded amount may be but a portion of the total purchase price.

Figure 5:
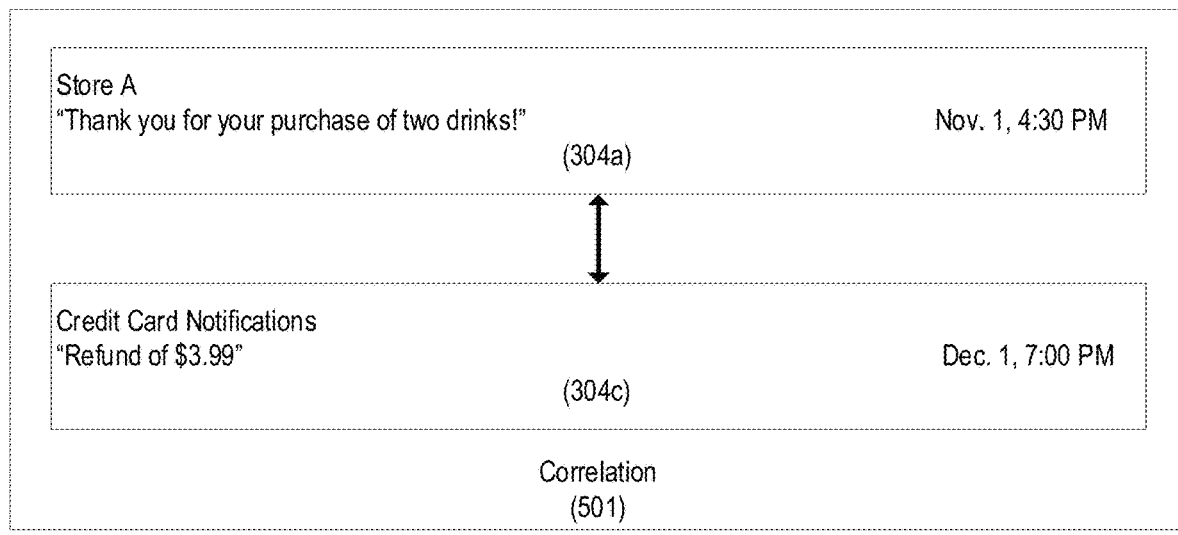
FIG. 5 depicts a correlation between two electronic communications, with one corresponding to a purchase and the other corresponding to a partial refund of that purchase.

FIG. 5 depicts a correlation 501 between the first electronic communication 304a and the third electronic communication 304c. The first electronic communication 304a and the third electronic communication 304c may be correlated based on the process illustrated in FIG. 4B, and based on the steps depicted in FIG. 2. In this manner, even though the first electronic communication 304a and the third electronic communication 304c might not be obviously related, the process depicted in FIG. 4B and FIG. 2 may correlate the two communications. Additionally or alternatively, the first electronic communication 304a may be associated with a first transaction listed in the user's account and the third electronic communication 304c may associated with a second transaction in the user's account. The first transaction and the second transaction may be correlated based on the correlation between the first electronic communication 304a and the third electronic communication 304c. In some examples, the first electronic communication 304a and the third electronic communication 304c may be correlated based on a relationship between the first transaction and the second transaction.

Figure 6:
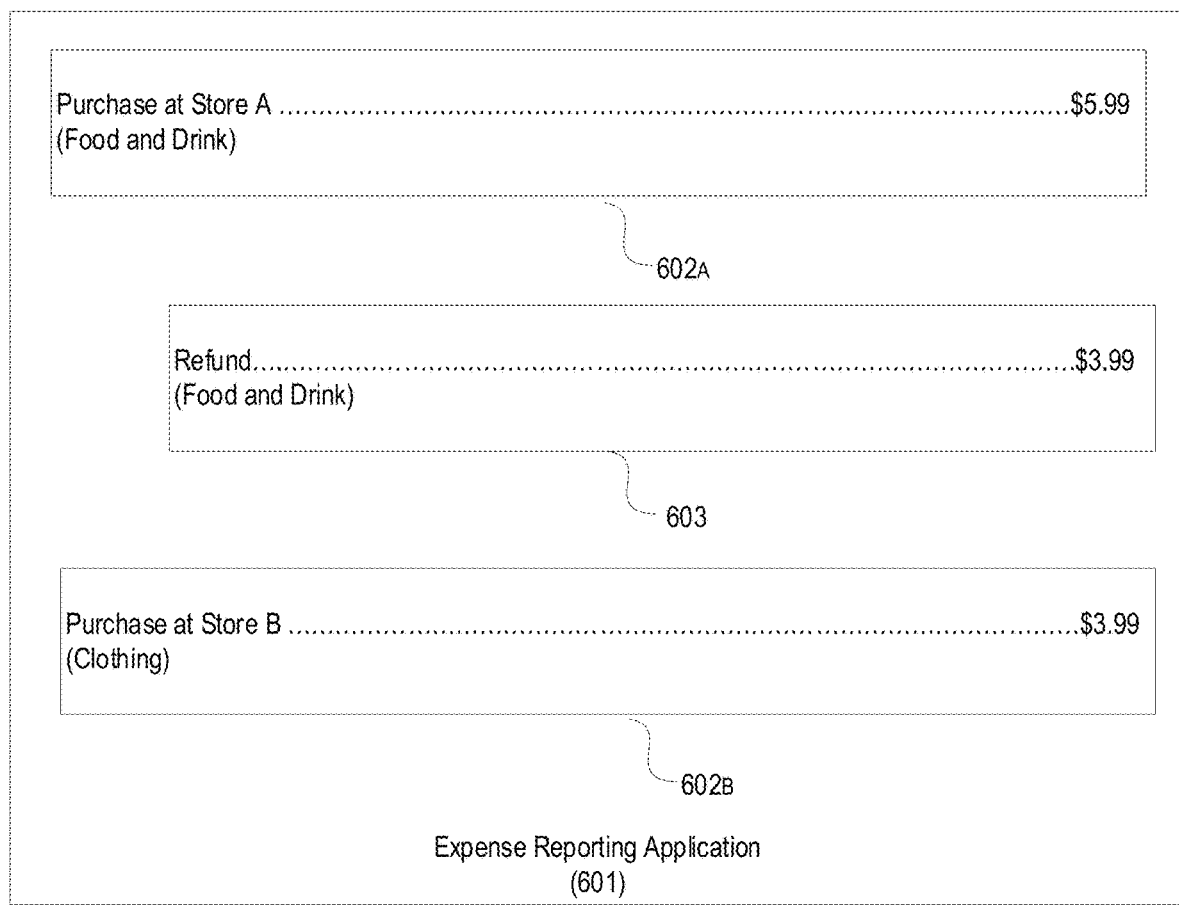
FIG. 6 depicts an expense reporting application, depicting a purchase and an associated partial refund.

FIG. 6 depicts an expense reporting application 601 showing two purchases 602a-602b and a refund indication 603. The two purchases 602a-602b, which include a first purchase 602a and a second purchase 602b, may have been provided to the expense reporting application 601 manually (e.g., via user input), based on information stored in the payment card database 109, or the like. The refund indication 603 may be part of the output described with respect to step 206 of FIG. 2.

As can be seen by comparing the refund indication 603 to the corresponding purchase (that is, the first purchase 602a), a refund indication may indicate a partial refund of a purchase. For example, the refund indication 603 indicates that only $3.99 was refunded, but the first purchase 602a corresponds to $5.99, such that $2.00 was not refunded. Without the benefit of the process depicted in FIG. 2, the refund indication 603 might improperly be associated with the second purchase 602b, merely because the two correspond to the same dollar figure ($3.99). As such, the process described in FIG. 2 improves the accuracy of expense reporting applications, such as the expense reporting application 601.

The indentation of the refund indication 603 shows that the refund indication 603 corresponds to the first purchase 602a. The expense reporting application 601 need not show the first purchase 602a and the refund indication 603. For example, rather than indenting the refund indication 603, the expense reporting application 601 may display the first purchase 602a as $2.00, then, based on user input (e.g., clicking a link associated with the first purchase 602a), allow a user to access a greater detail of the transaction, including the refund indication 603.

As indicated above, the refund indication 603 may be part of the output described with respect to step 206 of FIG. 2. In particular, the refund indication 603 may correspond to the third communication 304c, which may have been determined to be associated with the first communication 304a based on the steps described in FIG. 2. In other words, the refund indication 603 might not have been received from a user or provided by the payment card database 109, but instead might be generated as part of step 206 of FIG. 2.

The two purchases 602a-602b and the refund indication 603 may be categorized. For example, the first purchase 602a may be associated with a food and drink category, whereas the second purchase 602b may be associated with a clothing category. In turn, the refund indication 603, by virtue of being associated with the first purchase 602a, may be associated with the food and drink category. In this manner, refund indications generated based on the process depicted in FIG. 2 may be categorized by an expense reporting application to better correlate the refund with a corresponding purchase.

Figure 7:
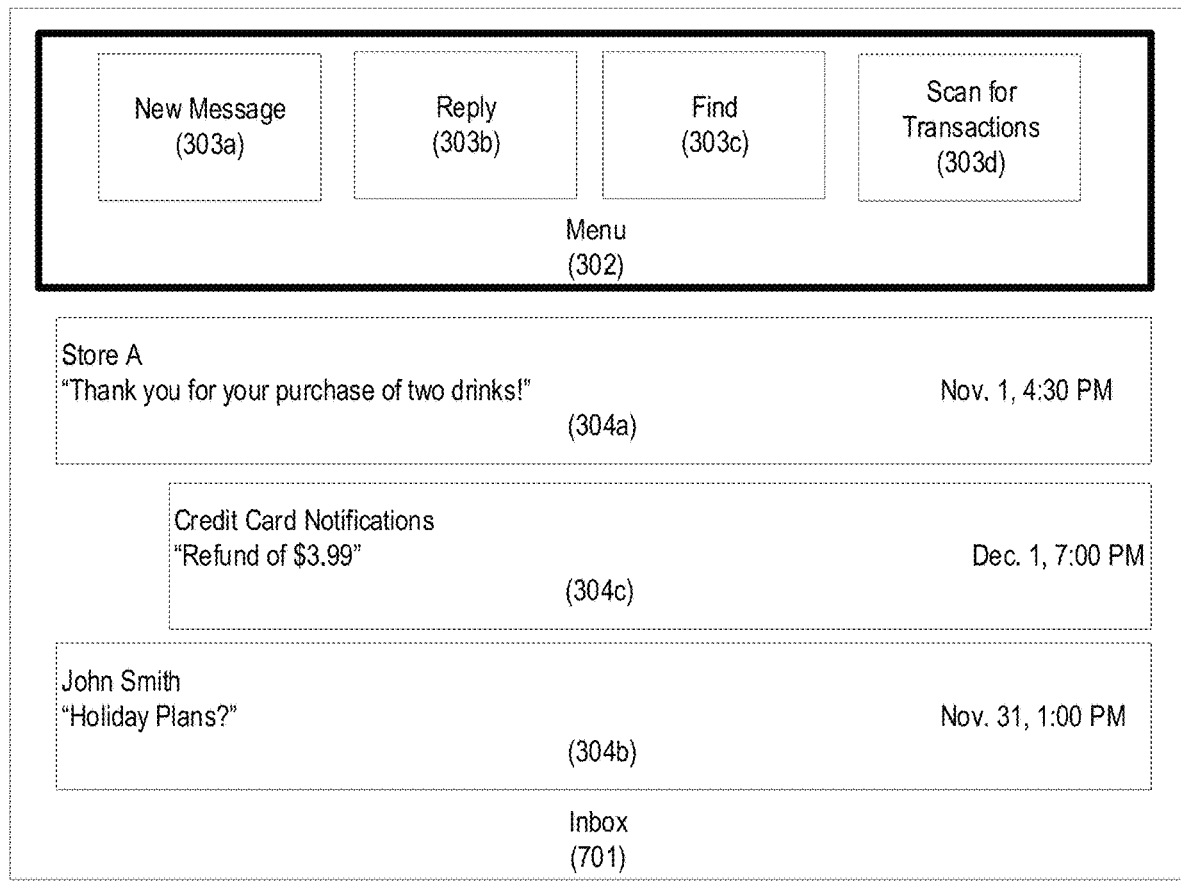
FIG. 7 depicts an inbox similar to that of FIG. 3, albeit modified to correlate an electronic communication associated with a purchase with an electronic communication associated with a refund.

FIG. 7 depicts a modified version of the inbox 301, shown as an inbox 701, where, as was the case with the expense reporting application 601 of FIG. 6, the third electronic communication 304c is shown as correlated with the first electronic communication 304a, even though the inbox 701. This display may be the result of the output described with respect to step 206 of FIG. 2. In particular, the third electronic communication 304c is depicted directly under, and indented with respect to, the first electronic communication 304a, even though the inbox 701 might be otherwise displayed chronologically. In this manner, a correlation between the first electronic communication 304a and the third electronic communication 304c (e.g., the correlation 501) is displayed.

FIG. 8 depicts an electronic communication 801 (e.g., a text message, a pop-up message, or the like) which may be output as part of step 206 of FIG. 2. Such an electronic communication may be in addition to the various forms of output depicted in FIGS. 6 and 7, such as displaying the correlation 501 in the expense reporting application 601 and/or displaying the correlation 501 in the inbox 701. The electronic communication 801 shown in FIG. 8 indicates the correlation 501, and in particular indicates that a refund (e.g., the $2.99 refund indicated by the third electronic communication 304c) has been issued for a payment (e.g., the $5.99 purchase indicated by the purchase 602a and/or the first electronic communication 304a). The electronic communication 801 may be transmitted to an electronic application, such as one of the other applications 131, and/or stored in a communications database, such as the communications database 105. In this manner, the electronic communication may be displayed in, for example, the inbox 701. While FIG. 8 shows an example of a refund being processed, it will be appreciated that electronic communication 801 may be used to convey additional information, for example, such that a return has been processed, but a refund has not yet been received.

The techniques generally described above improve the manner in which computing devices store, analyze, and output information regarding electronic communications. In particular, the techniques described herein provide a comprehensive technique of correlating communications with transactional information. This may allow a user to better track their spending habits, in addition to allowing users to better manage their finances in a more efficient manner. Accordingly, the natural language processing techniques described herein improve the speed and efficiency with which computing devices recognize and associate communications with their related transactional information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method configured to automatically identify discrepancies between electronic refund communications and received refund amounts reflected in payment databases, the method comprising:
    receiving, by a computing device, a first communication of a first communication type that indicates an update to a past financial transaction;
    identifying, by the computing device, a second communication of a second communication type that is different from the first communication type by:
        processing the first communication to determine predicted characteristics of the second communication; and
        querying based on the predicted characteristics, a database storing communications of the second communication type;
    correlating, by the computing device, the first communication and the second communication by:
        identifying, by the computing device, at least one good or service of the past financial transaction by processing, using one or more natural language processing algorithms, the first communication to identify one or more first words in the first communication that correspond to an old title of the at least one good or service; and
        identifying, by the computing device, a portion of the second communication corresponding to the at least one good or service of the past financial transaction by processing, based on the one or more first words, the second communication to identify one or more second words in the second communication that correspond to a new title of the at least one good or service;
    retrieving, by the computing device and from a payment card database, payment information associated with the past financial transaction;
    identifying, by the computing device, based on correlating the first communication and the second communication, and based on the payment information, a payment discrepancy associated with the past financial transaction; and
    causing, by the computing device, output of an indication of the payment discrepancy.

2. The method of claim 1, wherein the first communication type comprises a text message, and wherein the second communication type comprises an e-mail.

3. The method of claim 1, wherein the identifying the portion of the second communication corresponding to the at least one good or service of the past financial transaction comprises:
    identifying, in the second communication, an identifier of the at least one good or service, wherein the first communication comprises the identifier.

4. The method of claim 1, wherein the identifying the portion of the second communication corresponding to the at least one good or service of the past financial transaction comprises:
    identifying, in the second communication, a refund amount corresponding to the at least one good or service, wherein the first communication comprises a payment amount equal to the refund amount.

5. The method of claim 1, wherein the identifying the portion of the second communication corresponding to the at least one good or service of the past financial transaction comprises:
    determining, based on one or more words of the second communication, that the second communication relates to one or more of: a refund, a return, or a replacement.

6. The method of claim 1, wherein the correlating the first communication and the second communication comprises:
    comparing the portion of the second communication corresponding to the at least one good or service of the past financial transaction with a corresponding portion of the first communication.

7. The method of claim 1, further comprising:
    determining, by the computing device and based on metadata of the first communication, the predicted characteristics of the second communication.

8. The method of claim 1, wherein the processing the second communication comprises processing the second communication using of a fuzzy logic algorithm of the one or more natural language processing algorithms.

9. An apparatus configured to automatically identify discrepancies between electronic refund communications and received refund amounts reflected in payment databases, the apparatus comprising:
    one or more processors; and memory storing instructions that, when executed by the one or more processors, cause the apparatus to:
- receive a first communication of a first communication type that indicates an update to a past financial transaction;
- identify a second communication of a second communication type that is different from the first communication type by:
  - processing the first communication to determine predicted characteristics of the second communication; and
  - querying, based on the predicted characteristics, a database storing communications of the second communication type;
- correlate the first communication and the second communication by:
  - identifying at least one good or service of the past financial transaction by processing, using one or more natural language processing algorithms, the first communication to identify one or more first words in the first communication that correspond to an old title of the at least one good or service; and
  - identifying a portion of the second communication corresponding to the at least one good or service of the past financial transaction by processing, based on the one or more first words, the second communication to identify one or more second words in the second communication that correspond to a new title of the at least one good or service;
- retrieve, from a payment card database, payment information associated with the past financial transaction;
- identify based on correlating the first communication and the second communication, and based on the payment information, a payment discrepancy associated with the past financial transaction; and
- cause output of an indication of the payment discrepancy.

10. The apparatus of claim 9, wherein the first communication type comprises a text message, and wherein the second communication type comprises an e-mail.

11. The apparatus of claim 9, wherein the instructions, when executed by the one or more processors, cause the apparatus to identify the portion of the second communication corresponding to the at least one good or service of the past financial transaction by causing the apparatus to:
- identify, in the second communication, an identifier of the at least one good or service, wherein the first communication comprises the identifier.

12. The apparatus of claim 9, wherein the instructions, when executed by the one or more processors, cause the apparatus to identify the portion of the second communication corresponding to the at least one good or service of the past financial transaction by causing the apparatus to:
- identify, in the second communication, a refund amount corresponding to the at least one good or service, wherein the first communication comprises a payment amount equal to the refund amount.

13. The apparatus of claim 9, wherein the instructions, when executed by the one or more processors, cause the apparatus to identify the portion of the second communication corresponding to the at least one good or service of the past financial transaction by causing the apparatus to:
- determine, based on one or more words of the second communication, that the second communication relates to one or more of: a refund, a return, or a replacement.

14. The apparatus of claim 9, wherein the instructions, when executed by the one or more processors, cause the apparatus to correlate the first communication and the second communication by causing the apparatus to:
- compare the portion of the second communication corresponding to the at least one good or service of the past financial transaction with a corresponding portion of the first communication.

15. One or more non-transitory computer-readable media storing instructions that, when executed by one or more processors, cause the one or more processors to automatically identify discrepancies between electronic refund communications and received refund amounts reflected in payment databases by causing the one or more processors to perform steps comprising:
- receiving a first communication of a first communication type that indicates an update to a past financial transaction;
- identifying a second communication of a second communication type that is different from the first communications type by:
  - processing the first communication to determine predicted characteristics of the second communication; and
  - querying based on the predicted characteristics, a database storing communications of the second communication type;
- correlating the first communication and the second communication by:
  - identifying at least one good or service of the past financial transaction by processing, using one or more natural language processing algorithms, the first communication to identify one or more first words in the first communication that correspond to an old title of the at least one good or service; and
  - identifying a portion of the second communication corresponding to the at least one good or service of the past financial transaction by processing, based on the one or more first words, the second communication to identify one or more second words in the second communication that correspond to a new title of the at least one good or service;
- retrieving, from a payment card database, payment information associated with the past financial transaction;
- identifying, based on correlating the first communication and the second communication, and based on the payment information, a payment discrepancy associated with the past financial transaction; and
- causing output of an indication of the payment discrepancy.

16. The computer-readable media of claim 15, wherein the first communication type comprises a text message, and wherein the second communication type comprises an e-mail.

17. The computer-readable media of claim 15, wherein the instructions, when executed, cause the identifying the portion of the second communication corresponding to the at least one good or service of the past financial transaction by causing:
- identifying, in the second communication, an identifier of the at least one good or service, wherein the first communication comprises the identifier.

18. The computer-readable media of claim 15, wherein the instructions, when executed, cause the identifying the portion of the second communication corresponding to the at least one good or service of the past financial transaction by causing:

identifying, in the second communication, a refund amount corresponding to the at least one good or service, wherein the first communication comprises a payment amount equal to the refund amount.

19. The computer-readable media of claim 15, wherein the instructions, when executed, cause the identifying the portion of the second communication corresponding to the at least one good or service of the past financial transaction by causing:

determining, based on one or more words of the second communication, that the second communication relates to one or more of: a refund, a return, or a replacement.

20. The computer-readable media of claim 15, wherein the instructions, when executed, cause the correlating the first communication and the second communication by causing:

comparing the portion of the second communication corresponding to the at least one good or service of the past financial transaction with a corresponding portion of the first communication.

* * * * *